US012652148B2

(12) United States Patent (10) Patent No.: US 12,652,148 B2
Okano et al. (45) Date of Patent: Jun. 9, 2026

(54) TERMINAL, BASE STATION AND COMMUNICATION METHOD

(71) Applicant: NTT DOCOMO, INC., Tokyo (JP)

(72) Inventors: Mayuko Okano, Tokyo (JP); Hiroki Harada, Tokyo (JP); Naoya Shibaike, Tokyo (JP); Shohei Yoshioka, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 427 days.

(21) Appl. No.: 18/042,545

(22) PCT Filed: Oct. 12, 2020

(86) PCT No.: PCT/JP2020/038548
§ 371 (c)(1),
(2) Date: Feb. 22, 2023

(87) PCT Pub. No.: WO2022/079781
PCT Pub. Date: Apr. 21, 2022

(65) Prior Publication Data
US 2023/0327841 A1 Oct. 12, 2023

(51) Int. Cl.
*H04L 5/00* (2006.01)
*H04W 72/0453* (2023.01)
*H04W 72/21* (2023.01)

(52) U.S. Cl.
CPC ........... *H04L 5/0092* (2013.01); *H04W 72/21* (2023.01); *H04W 72/0453* (2013.01)

(58) Field of Classification Search
CPC ..... H04L 5/0092; H04L 5/001; H04L 5/0064; H04L 5/14; H04L 5/0026; H04L 5/0053; H04W 72/21; H04W 72/0453
See application file for complete search history.

(56) References Cited

U.S. PATENT DOCUMENTS

| | | | | |
|---|---|---|---|---|
| 11,496,248 B2 * | 11/2022 | Tang | ..................... | H04L 1/1854 |
| 11,825,346 B2 * | 11/2023 | Kim | ..................... | H04W 72/21 |
| 12,133,258 B2 * | 10/2024 | Chande | ............ | H04W 74/0816 |
| 2013/0203458 A1 * | 8/2013 | Charbit | ................ | H04L 5/0032 |
| | | | | 455/522 |
| 2019/0090231 A1 * | 3/2019 | Zhang | ................ | H04L 27/2602 |
| 2019/0349178 A1 * | 11/2019 | Jia | .......................... | H04L 5/0094 |
| 2021/0050949 A1 * | 2/2021 | Tang | ..................... | H04L 5/1469 |

(Continued)

FOREIGN PATENT DOCUMENTS

| | | |
|---|---|---|
| CN | 110603878 A | 12/2019 |
| CN | 111095855 A | 5/2020 |

(Continued)

OTHER PUBLICATIONS

Office Action issued in Chinese Application No. 202080105868.1, mailed Jun. 19, 2024 (15 pages).

(Continued)

*Primary Examiner* — Brian T O Connor
(74) *Attorney, Agent, or Firm* — Osha Bergman Watanabe & Burton LLP

(57) ABSTRACT

Provided is a terminal having: a controlling unit configured to determine a subcarrier spacing to be applied to a physical uplink control channel satisfying a bandwidth and map the physical uplink control channel to a physical resource; and a transmitting unit configured to transmit the physical resource to a base station.

3 Claims, 5 Drawing Sheets

(56) References Cited

U.S. PATENT DOCUMENTS

| | | | | |
|---|---|---|---|---|
| 2021/0211343 A1* | 7/2021 | Baldemair | ........ | H04W 72/1263 |
| 2022/0337374 A1* | 10/2022 | Tiirola | .................. | H04L 5/0094 |
| 2023/0055366 A1* | 2/2023 | Lunttila | ................ | H04L 5/0094 |
| 2023/0102996 A1* | 3/2023 | Harada | ................. | H04L 5/0091 |
| | | | | 370/329 |

FOREIGN PATENT DOCUMENTS

| | | |
|---|---|---|
| JP | 2020520590 A | 7/2020 |
| WO | 2018203823 A1 | 11/2018 |
| WO | 2019060048 A1 | 3/2019 |

OTHER PUBLICATIONS

Office Action issued in Japanese Application No. 2022-556706, dated Aug. 6, 2024 (6 pages).

3GPP TSG RAN WG1 #102-e; R1-2006907 "Required changes to NR using existing DL/UL NR waveform" Nokia, Nokia Shanghai Bell; e-Meeting; Aug. 17-29, 2020 (26 pages).

3GPP TS 38.300 V16.2.0 "3rd Generation Partnership Project; Technical Specification Group Radio Access Network; NR; NR and NG-RAN Overall Description; Stage 2 (Release 16)" Jul. 2020 (148 pages).

3GPP TS 38.306 V16.1.0 "3rd Generation Partnership Project; Technical Specification Group Radio Access Network; NR; User Equipment (UE) radio access capabilities (Release 16)" Jul. 2020 (106 pages).

International Search Report issued in International Application No. PCT/JP2020/038548, mailed May 18, 2021 (6 pages).

Written Opinion issued in International Application No. PCT/JP2020/038548; Dated May 18, 2021 (4 pages).

Office Action issued in Chinese Patent Application No. 202080105868. 1, issued Jun. 19, 2025 (13 pages).

* cited by examiner

FIG.1

Start

S11

Allocate a number of resource blocks achieving the required bandwidth to PUCCH

S12

Map PUCCH to a physical resource

End

Start

S21

Apply SCS to PUCCH to achieve required bandwidth in one resource block

S22

Map PUCCH to a physical resource

End

TERMINAL, BASE STATION AND COMMUNICATION METHOD

TECHNICAL FIELD

The present invention relates to a terminal, a base station and a communication method in a wireless communication system.

BACKGROUND

In NR (New Radio) (also referred to as "5G"), which is a successor system to LTE (Long Term Evolution), technologies are being discussed to satisfy requirements such as high-capacity systems, fast data transmission rates, low latency, simultaneous connection of a plurality of terminals, low cost, and lower power consumption (e.g., Non-patent Reference 1).

In NR release 17, using a frequency band higher than the conventional release (e.g., Non-patent Reference 2) has been discussed. For example, in a frequency band from 52.6 GHz to 71 GHz, applicable numerology including subcarrier spacing, channel bandwidth, etc., the design of physical layer, obstacles assumed in actual wireless communications and the like have been discussed.

RELATED ART

Non-Patent Reference

[Non-Patent Reference 1] 3GPP TS 38.300 V 16.2.0 (2020-07)
[Non-Patent Reference 2] 3GPP TS 38.306 V 16.1.0 (2020-07)

SUMMARY

Technical Problem

Regulations related to peak EIRP (equivalent isotropically radiated power) are specified in each country in a newly operated frequency band using higher frequencies. On the other hand, in a case of using a conventional uplink channel format, it is assumed that the bandwidth occupied in the frequency band becomes much narrower depending on the number of resource blocks to be allocated, and a situation may occur in which the regulations related to the peak EIRP cannot be satisfied.

The present invention has been made in view of the above points, and resource allocation adapted to a frequency band in a wireless communication system can be performed.

Solution to Problem

According to the disclosed technology, provided is a terminal having: a controlling unit configured to determine a subcarrier spacing to be applied to a physical uplink control channel satisfying a bandwidth and map the physical uplink control channel to a physical resource; and a transmitting unit configured to transmit the physical resource to a base station.

Beneficial Effect of the Invention

According to the disclosed invention, resource allocation adapted to a frequency band in a wireless communication system can be performed.

BRIEF DESCRIPTION OF THE DRAWINGS

FIG. 1 A drawing illustrating an example of a configuration of a wireless communication system according to an embodiment of the present invention.

DETAILED DESCRIPTION

Figure 2:
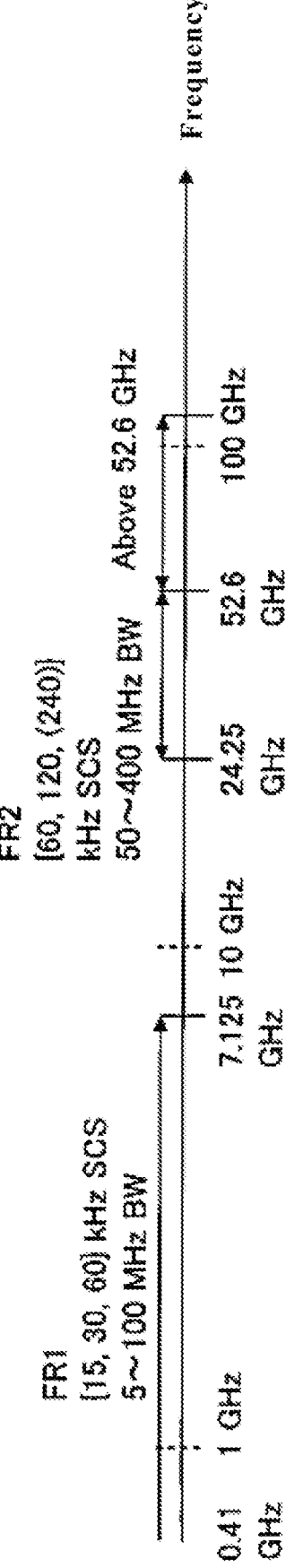
FIG. 2 A drawing illustrating an example of a frequency range according to an embodiment of the present invention.

Embodiments of the present invention are described below with reference to the drawings. It should be noted that the embodiments described below are examples and the embodiments to which the present invention is applied are not limited to the following embodiments.

Conventional techniques are appropriately used in the operation of the wireless communication system according to an embodiment of the present invention. However, the conventional techniques are, for example, a conventional LTE, but are not limited to the conventional LTE. Further, the term "LTE" used herein should have a broad meaning including LTE-Advanced and techniques after LTE-Advanced (for example, NR) unless otherwise specified.

In addition, in the embodiments of the present invention described below, terms such as SS (Synchronization signal), PSS (Primary SS), SSS (Secondary SS), PBCH (Physical broadcast channel), PRACH (Physical random access channel), PDCCH (Physical Downlink Control Channel), PDSCH (Physical Downlink Shared Channel), PUCCH (Physical Uplink Control Channel), and PUSCH (Physical Uplink Shared Channel) used in the conventional LTE are used. This is for convenience of description, and signals, functions, and the like, similar to the above may be referred to other names. Further, the above-mentioned terms in NR correspond to NR-SS, NR-PSS, NR-SSS, NR-PBCH, NR-PRACH and the like. However, a signal used for NR is not necessarily described as "NR-".

Further, in the embodiments of the present invention, a duplex method may be a TDD (Time Division Duplex) method, an FDD (Frequency Division Duplex) method, or any other method (for example, Flexible Duplex method).

Further, in the embodiments of the present invention, "configuring" a wireless parameter and the like may mean "pre-configuring" a predetermined value or configuring a wireless parameter indicated by a base station 10 or a terminal 20.

Figure 1:
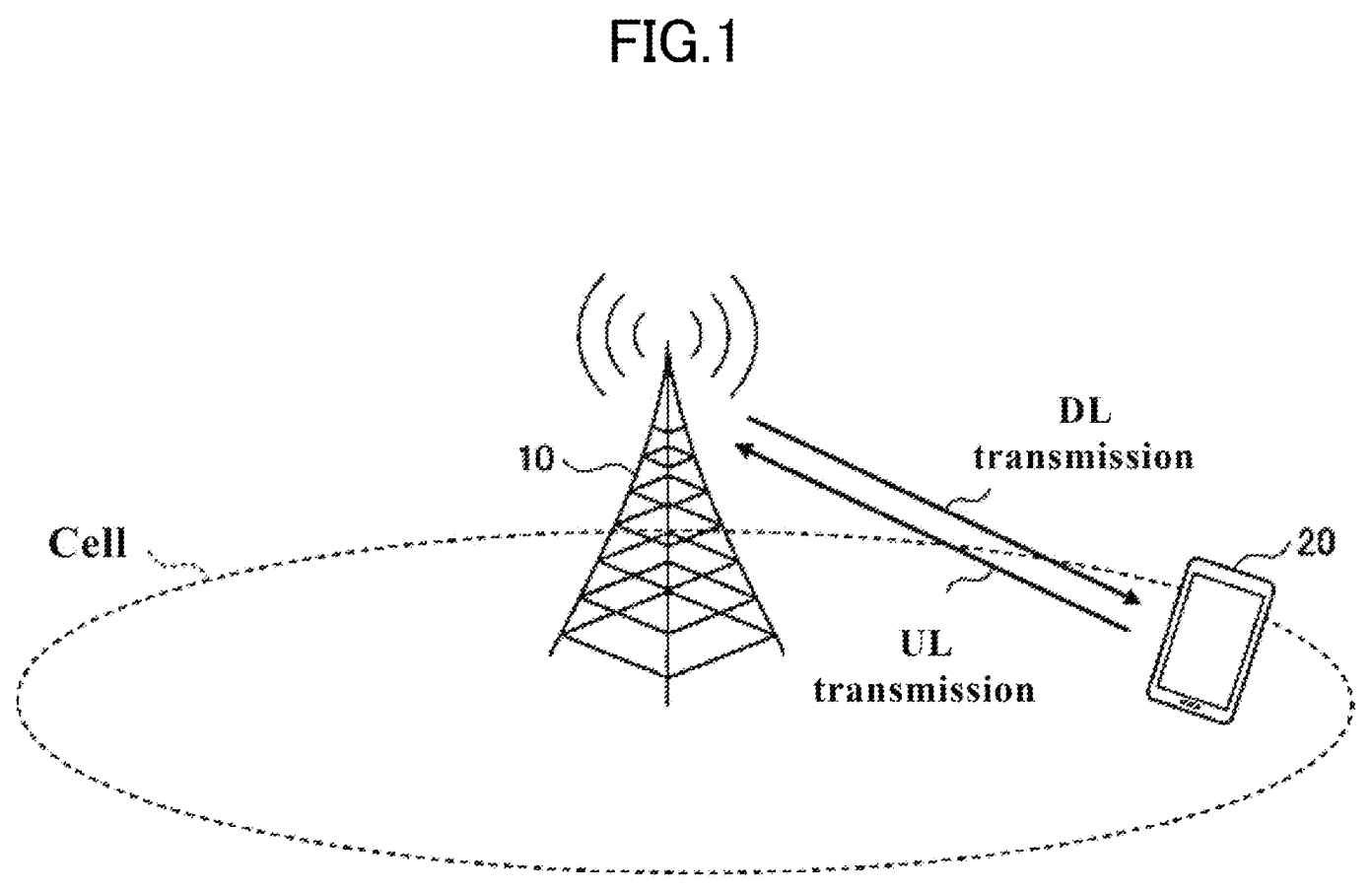

FIG. 1 is a drawing illustrating an example of a configuration of a wireless communication system according to an embodiment of the present invention. The wireless communication system according to an embodiment of the present invention includes a base station 10 and a terminal 20 as shown in FIG. 1. FIG. 1 shows one base station 10 and one terminal 20, but this is just an example and there may be a plurality of base stations 10 and terminals 20.

The base station 10 is a communication device that provides one or more cells and performs wireless communication with the terminal 20. Physical resources of a wireless signal may be defined in a time domain and a frequency domain, the time domain may be defined by a number of OFDM (Orthogonal Frequency Division Multiplexing) symbols, and the frequency domain may be defined by a number of subcarriers or a number of resource blocks. The base station 10 transmits a synchronization signal and system information to the terminal 20. The synchronization signal is, for example, NR-PSS and NR-SSS. The system information is transmitted by, for example, NR-PBCH, and is also referred to as communication information. The synchronization signal and the system information may be called SSB (SS/PBCH block). As shown in FIG. 1, the base station 10 transmits control signals or data to the terminal 20 by DL (Downlink) and receives a control signal or data from the terminal 20 by UL (Uplink). Both the base station 10 and the terminal 20 can transmit and receive signals by using beamforming. Further, both the base station 10 and the terminal 20 can apply MIMO (Multiple Input Multiple Output) communication to DL or UL. Further, both the base station 10 and the terminal 20 may communicate via a secondary cell (SCell: Secondary Cell) and a primary cell (PCell: Primary Cell) by using CA (Carrier Aggregation). Further, the terminal 20 may perform communication via a primary cell of the base station 10 and a primary secondary cell group cell (PSCell: Primary SCG Cell) of another base station 10, by using DC (Dual Connectivity).

The terminal 20 is a communication device having a wireless communication function, such as a smartphone, a mobile phone, a tablet, a wearable terminal, and a communication module for M2M (Machine-to-Machine). As shown in FIG. 1, the terminal 20 receives control signals or data from the base station 10 by DL and transmits control signals or data to the base station 10 by UL, thereby using various types of communication services provided by the wireless communication system. Further, the terminal 20 receives various reference signals transmitted from the base station 10 and measures the propagation path quality based on the reception result of the reference signals.

FIG. 2 is a drawing illustrating an example of a frequency range according to an embodiment of the present invention. In the NR specifications of 3GPP release 15 and release 16, the deployment of a frequency band of 52.6 GHz or higher has been discussed, for example. As shown in FIG. 2, FR (Frequency range) 1, in which the current deployment is defined, is a frequency range from 410 MHz to 7.125 GHz, in which SCS (Sub carrier spacing) is 15, 30 or 60 kHz, and the bandwidth is from 5 MHz to 100 MHz. FR2 is a frequency band from 24.25 GHz to 52.6 GHz, in which SCS of 60, 120 or 240 kHz is used, and the bandwidth is from 50 MHz to 400 MHz. For example, a frequency band to be newly deployed may be assumed to be from 52.6 GHz to 114.25 GHz.

In general, peak transmission power is regulated by law. Here, for example, according to a regulation at 57-71 GHz, a regulation related to EIRP (equivalent isotropically radiated power) is as follows.

1) Maximum average EIRP: 40 dBm
2) Maximum peak EIRP: 43 dBm
3) In a case where an emission bandwidth (emission-BW) is less than 100 MHz, the maximum peak conducted output power: 500 mW*emission bandwidth/100 MHz.
4) In a case where an emission bandwidth (emission-BW) is 100 MHz or more, the maximum peak conducted output power: 500 mW.

Here, as shown in Table 1, in some conventional PUCCH formats, there is a configuration in which a single resource block (Resource block, RB) is allocated. For example, the configuration corresponds to cases of PUCCH format 0/1/4 and PUCCH format 2/3 in which the number of resource blocks is configured to be 1.

TABLE 1

| Format | PUCCH format 0 | PUCCH format 1 | PUCCH format 2 | PUCCH format 3 | PUCCH format 4 |
|---|---|---|---|---|---|
| RB size | 1 RB | 1 RB | 1-16 RBs | 1-16 RBs | 1 RB |

As described above, a bandwidth of one resource block allocated to a PUCCH format is not necessarily long enough to achieve the maximum allowable EIRP while satisfying the maximum PSD (power spectrum density) limit, for example, in an unlicensed band at 60 GHz as shown in the above-described regulation.

Therefore, a method of allocating a plurality of resource blocks to PUCCH is being discussed. For example, in a case where it is necessary to allocate a bandwidth higher than 3.98 MHz to a PUCCH resource in order to achieve the maximum allowable EIRP, with respect to SCS of 480 kHz or 960 kHz, the bandwidth of one resource block is 5.76 MHz or 11.52 MHz, each of which has a sufficient length.

On the other hand, with respect to SCS of 120 kHz or 240 kHz, in order to obtain a bandwidth higher than 3.98 MHz, one resource block does not have a sufficient length, and at least three resource blocks or two resource blocks are required to achieve the maximum allowable EIRP.

As mentioned above, in order to achieve the maximum allowable EIRP, enhancement of PUCCH in an unlicensed band is required.

Therefore, in order to meet the regulations of each country, to achieve the maximum allowable EIRP, and to enhance PUCCH coverage, 1) and 2) shown below are proposed.

1) A number of resource blocks can be configured to each PUCCH format.
2) SCS is applied so that one resource block allocated to PUCCH satisfies the required bandwidth.

Figure 3:
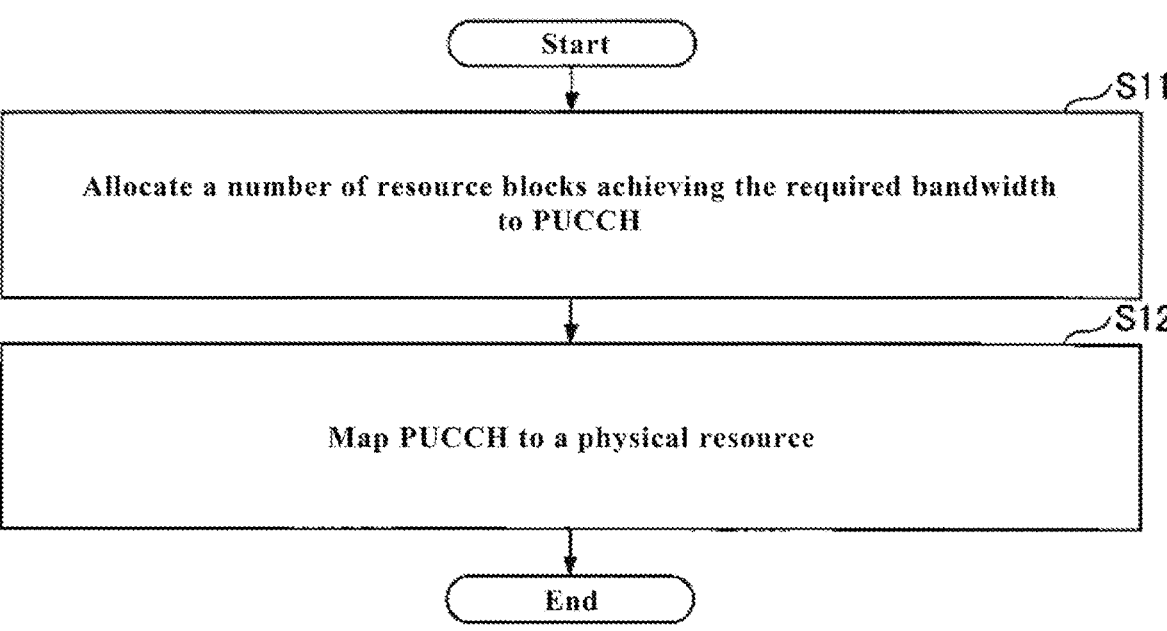
FIG. 3 A flowchart illustrating an example (1) of PUCCH according to an embodiment of the present invention.

FIG. 3 is a flowchart illustrating an example (1) of a PUCCH according to an embodiment of the present invention. In step S11, a terminal 20 allocates a number of resource blocks to PUCCH to achieve the required bandwidth. The number of resource blocks X allocated to PUCCH can be configured with changes and may be specified in advance in the specification or may be configured by RRC (Radio Resource Control) configuration, for example. That is, a base station 10 may configure a number of resource blocks X allocated to PUCCH to the terminal 20 via RRC signaling. Note that the resource block is an example of a unit in frequency domain, and other units in frequency domain such as a number of subcarriers may be used.

The number of resource blocks X allocated to PUCCH is a value satisfying the required bandwidth. Further, the number of resource blocks X allocated to PUCCH may be determined based on SCS. For example: three resource blocks in a case where SCS is 120 kHz; two resource blocks in a case where SCS is 240 kHz; one resource block in a case where SCS is 480 kHz; and one resource block in a case where SCS is 960 kHz, may be configured to PUCCH, respectively. The number of resource blocks X is an example indicating a size in frequency domain, and other representations indicating a size in frequency domain, such as a number of subcarriers Y, may be used.

Further, the number of resource blocks X allocated to PUCCH may be determined based on TCI (Transmission Configuration Indicator) or an RRC information element "PUCCH-SpatialRelationInfo". TCI and PUCCH-Spatial-RelationInfo are parameters related to spatial multiplexing, and are used for configuring a beam applied to PUCCH, for example.

For example: one resource block in a case where the TCI state ID (TCI state ID) is 0; two resource blocks in a case where the TCI state ID is 1; and three resource blocks in a case where the TCI state ID is 2, may be configured to PUCCH, respectively.

For example, in a case where PUCCH-SpatialRelation-Info is enabled by an upper layer parameter, a number of resource blocks allocated to PUCCH may be configured based on PUCCH-SpatialRelationInfo. On the other hand, in a case where PUCCH-SpatialRelationInfo is not provided by the upper layer, a number of resource blocks allocated to PUCCH may be configured based on a TCI state ID.

A number of possible values of a number of resource blocks X allocated to PUCCH may be predetermined by the specification, may be configured by an RRC configuration, or may be indicated by DCI (Downlink Control Information).

As described above, the number of resource blocks X may be determined based on an RRC information element, a DCI value, or a parameter related to spatial multiplexing.

With respect to resource arrangement of PUCCH, for example, contiguous resources may be allocated, non-contiguous resources may be allocated, or a bit map based on a resource block group (RBG) may be used for allocation. The bit map based on RBG may be similar to frequency-domain resource allocation type 0.

In subsequent step S12, the terminal 20 maps PUCCH to a physical resource. The terminal 20 may map PUCCH to the physical resource as shown in 1)-5) below.

1) Transmission is repeatedly mapped to each of a plurality of allocated resource blocks. For example, in a case where a number of allocated resource blocks is X, an interlace value may be configured to be 0 and a number of interlaces may be configured to be X.

2) In a case of PUCCH format 0 and PUCCH format 1, a new sequence is used. For example, as the resources allocated to the frequency domain are increased from a conventional PUCCH format 0 and PUCCH format 1, a sequence having a longer sequence length than a sequence used in a conventional PUCCH format 0 and PUCCH format 1 may be used.

3) In a case of PUCCH format 2 and PUCCH format 3, a code rate r, a modulation order $Q_m$, a number of PUCCH symbols $N_{symb\text{-}UCI}^{PUCCH}$, and a number of subcarriers $N_{SC,ctrl}^{RB}$ per resource block for each PUCCH format are adjusted. One or more of the above-described parameters may be adjusted. Note that, in a case where it is not possible to adjust a resource in a frequency domain by adjusting these parameters, exception processing may occur. For example, the code rate or the modulation order may be decreased as the resources allocated to the frequency domain are increased from a conventional PUCCH format 2 and PUCCH format 3.

4) In a case of PUCCH format 2 and PUCCH format 3, a UCI bit is added to the PUCCH format or a reference signal is added to a physical resource. For example, the insertion density of a reference signal may be increased or a padding bit may be added as the resources allocated to the frequency domain are increased from a conventional PUCCH format 2 and PUCCH format 3.

5) Multiplexing with TDD-OCC (Time Division Duplex Orthogonal Cover Code). For example, multiplexing with PUCCH of another user may be performed. Further, multiplexing according to FDD-OCC (Frequency Division Duplex Orthogonal Cover Code) may be performed.

The options 1)-5) above may be applied independently to each PUCCH format. And the options 1)-5) above may be combined to be applied to each PUCCH format.

Note that the terminal 20 may report to the base station 10 whether or not the resource block allocation to PUCCH described above is supported, based on a UE capability. In addition, the above-described proposal 1) and the proposal 2) to be described below, or respective options may be combined. The above-described proposal may be supported in a case where a specific upper layer parameter is configured. For example, in a case where the upper layer parameter is not provided, a number of resource blocks allocated to PUCCH may be configured based on the current specification, may be configured based on a new specification for unlicensed bands above 52.6 GHz, or may be indicated via DCI. Note that the UE capability may be described as UE capability information, or may be information indicating the capability of the terminal 20 to be indicated from the terminal 20 to the base station 10.

Figure 4:
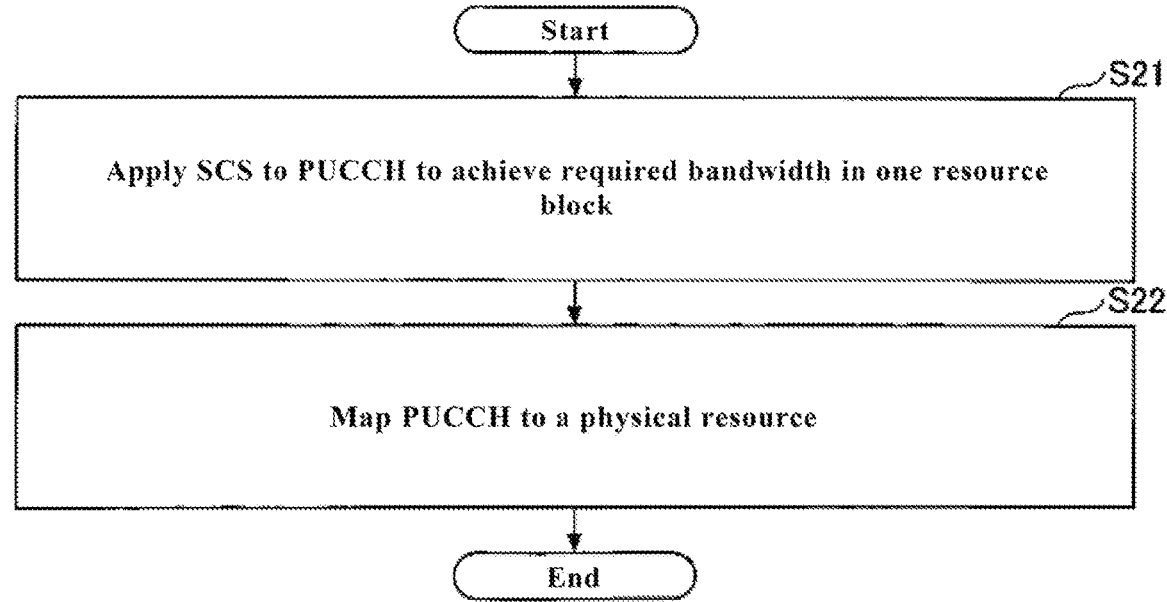
FIG. 4 A flowchart illustrating an example (2) of PUCCH according to an embodiment of the present invention.

FIG. 4 is a flowchart illustrating an example (2) of a PUCCH according to an embodiment of the present invention. In step S21, the terminal 20 applies SCS that achieves a bandwidth required in one resource block to PUCCH. For example, SCS applied to PUCCH may be different from SCS applied to other channels. Further, for example, the terminal 20 may apply SCS satisfying a bandwidth required for achieving the maximum allowable EIRP in one resource block to PUCCH, and may use a PUCCH format specified in the current specification. For example, one of SCSs of 480 kHz and 960 kHz may be applied to PUCCH because SCS of 480 kHz or 960 kHz satisfies the bandwidth required by one resource block.

Further, a plurality of SCSs may be candidates to be applied to PUCCH. SCS may be selected based on a TCI or RRC information element "PUCCH-SpatialRelationInfo". For example: SCS of 120 kHz in a case where the TCI state ID is 0; SCS of 240 kHz in a case where the TCI state ID is 1; and SCS of 480 kHz in a case where the TCI state ID is 2, may be applied to PUCCH.

One or more SCSs to be applied to PUCCH may be specified in the specification, configured by the RRC configuration, or indicated by DCI. For example, a plurality of SCSs may be configured based on the RRC information element "PUCCH-SpatialRelationInfo", and DCI may indicate which SCS to be used, or which SCS is to be used may be determined by the specification. Note that the terminal 20 may report to the base station 10 whether or not the SCS configuration method to PUCCH described above is supported, based on the UE capability.

Note that the above proposals may be supported in a case where a specific upper layer parameter is configured. For example, in a case where the upper layer parameter is not provided, SCS applied to PUCCH may be configured based on the current specification, may be configured based on a new specification for unlicensed bands above 52.6 GHz, or may be indicated via DCI.

Note that step S22 may be performed in the same manner as step S12 shown in FIG. 3.

Note that, in a case where SCSs are different between PUCCH and other channels, the terminal 20 may assume a delay in switching of SCS. The terminal 20 may report to the base station 10 whether or not the SCS configuration method to PUCCH described above is supported, based on the UE capability.

Note that the above proposals may be supported when a specific upper layer parameter is configured. For example, in a case where the upper layer parameter is not provided, a number of SCS candidates to be applied to PUCCH may be configured based on the current specification, may be configured based on a new specification, for example, for unlicensed bands above 52.6 GHz, or may be indicated via DCI.

According to the embodiments above, the base station 10 and the terminal 20 can configure a bandwidth of PUCCH that satisfies regulations related to a peak EIRP by controlling a number of resource blocks or SCSs.

That is, resource allocation adapted to a frequency band in a wireless communication system can be performed.

(Device Configuration)

Next, an example of a functional configuration of the base station 10 and the terminal that execute processes and operations described so far is described. The base station 10 and the terminal 20 have functions for performing the above embodiments. However, the base station 10 and the terminal 20 each may have only some of the functions in the embodiments.

<Base Station 10>

Figure 5:
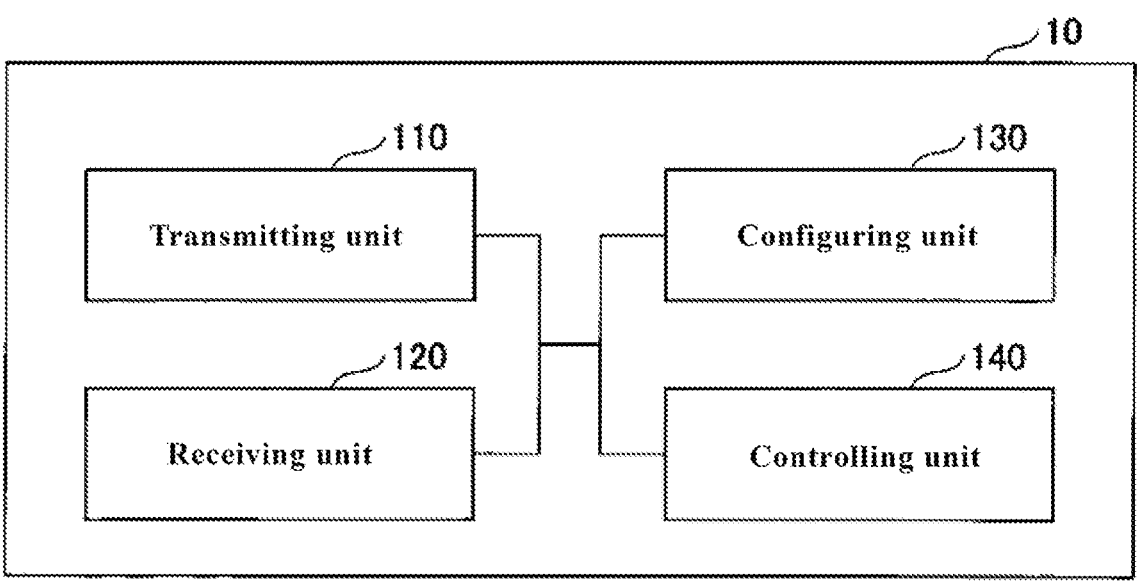
FIG. 5 A drawing illustrating an example of a functional configuration of a base station 10 according to an embodiment of the present invention.

FIG. 5 is a drawing illustrating an example of a functional configuration of a base station 10 according to an embodiment of the present invention. As shown in FIG. 5, the base station 10 comprises a transmitting unit 110, a receiving unit 120, a configuring unit 130, and a controlling unit 140. The functional configuration shown in FIG. 5 is only an example. Any functional classification and any functional unit name may be used as long as the operations according to the embodiments of the present invention can be performed.

The transmitting unit 110 has a function of generating a signal to be transmitted to the terminal side and transmitting the signal wirelessly. Further, the transmitting unit 110 transmits a message between network nodes to another network node. The receiving unit 120 has a function of receiving various signals transmitted from the terminal 20 and acquiring information of, for example, a higher layer from the received signals. The transmitting unit 110 also has a function of transmitting NR-PSS, NR-SSS, NR-PBCH, DL/UL control signals and the like to the terminal 20. Further, the receiving unit 120 receives a message between network nodes from another network node.

The configuring unit 130 stores pre-configured configuration information and various configuration information to be transmitted to the terminal 20. Content of the configuration information is, for example, information related to measurement configuration.

The controlling unit 140, as described in the embodiments, controls the measurement configuration. The controlling unit 140 also performs scheduling. The functional unit related to signal transmission in the controlling unit 140 may be included in the transmitting unit 110, and the functional unit related to signal reception in the controlling unit 140 may be included in the receiving unit 120.

<Terminal 20>

Figure 6:
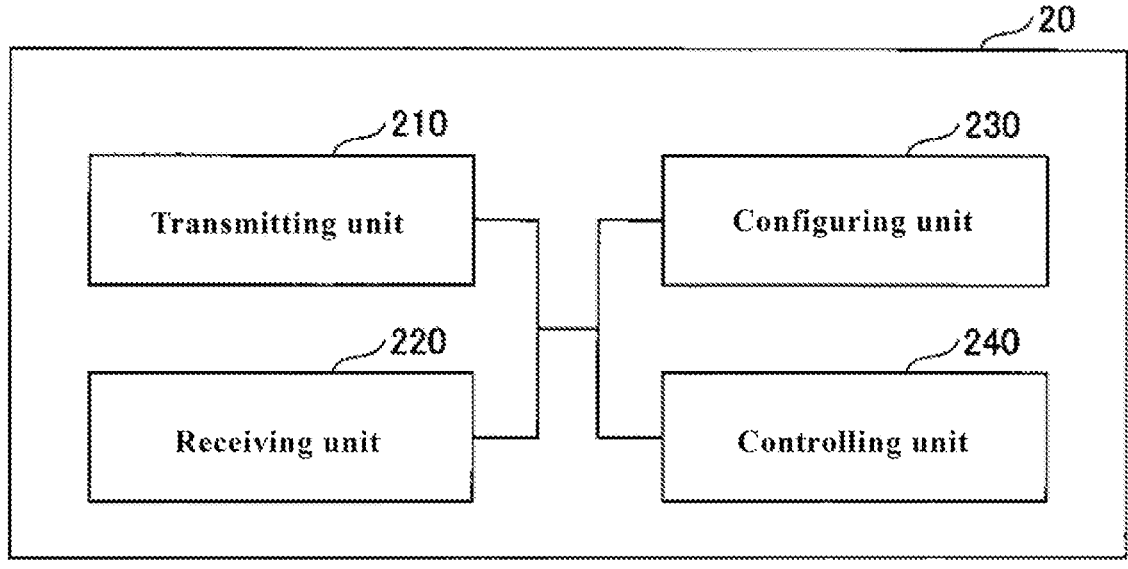
FIG. 6 A drawing illustrating an example of a functional configuration of a terminal 20 according to an embodiment of the present invention.

FIG. 6 is a drawing illustrating an example of a functional configuration of a terminal 20 according to an embodiment of the present invention. As shown in FIG. 6, the terminal 20 comprises a transmitting unit 210, a receiving unit 220, a configuring unit 230, and a controlling unit 240. The functional configuration shown in FIG. 6 is only an example. Any functional classification and any functional unit name may be used as long as the operations according to the embodiments of the present invention can be performed.

The transmitting unit 210 generates a transmission signal from the transmission data and transmits the transmission signal wirelessly. The receiving unit 220 receives various signals wirelessly and acquires a signal of a higher layer from the received signal of a physical layer. The receiving unit 220 also has a function of receiving NR-PSS, NR-SSS, NR-PBCH, DL/UL/SL control signals and the like transmitted from the base station 10. Further, for example, the transmitting unit 210, as D2D communication, transmits PSCCH (Physical Sidelink Control Channel), PSSCH (Physical Sidelink Shared Channel), PSDCH (Physical Sidelink Discovery Channel), PSBCH (Physical Sidelink Broadcast Channel) and the like to other terminals 20, and the receiving unit 220 receives PSCCH, PSSCH, PSDCH, PSBCH and the like from other terminals 20.

The configuring unit 230 stores various configuration information received from the base station 10 by the receiving unit 220. The configuring unit 230 also stores pre-configured configuration information. Content of the configuration information is, for example, information related to measurement configuration.

The controlling unit 240, as described in the embodiments, controls the measurement configuration. The functional unit related to signal transmission in the controlling unit 240 may be included in the transmitting unit 210, and the functional unit related to signal reception in the controlling unit 240 may be included in the receiving unit 220.

(Hardware Configuration)

Block diagrams (FIG. 5 and FIG. 6) used in the description of the embodiments above show blocks of each function unit. These functional blocks (configuration units) are achieved by any combination of at least one of hardware and software. Further, the method of achieving each functional block is not particularly limited. That is, each functional block may be achieved by using one physically or logically coupled device, by directly or indirectly (for example, in a wired or wireless manner) connecting two or more physically or logically separated devices, and by using these multiple devices. The functional block may be achieved by combining software with the one device above or the plurality of devices above.

The functions include, but are not limited to, judging, deciding, determining, computing, calculating, processing, deriving, investing, searching, confirming, receiving, transmitting, outputting, accessing, resolving, choosing, selecting, establishing, comparing, assuming, expecting, treating, broadcasting, notifying, communicating, forwarding, configuring, reconfiguring, allocating, mapping, assigning, etc. For example, a functional block (configuration unit) that makes transmission function is called a transmitting unit or a transmitter. As described above, neither of these methods is specifically limited.

Figure 7:
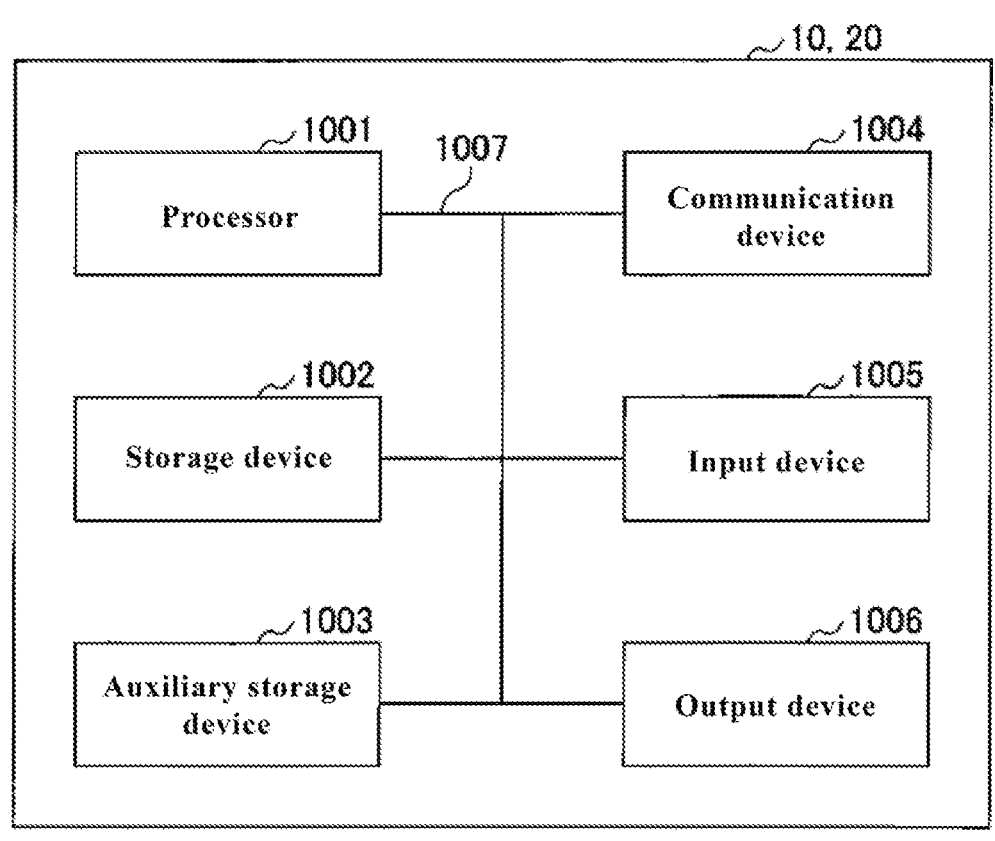
FIG. 7 A drawing illustrating an example of a hardware configuration of a base station 10 or of a terminal 20 according to an embodiment of the present invention.

For example, the base station 10, the terminal 20 and the like in one embodiment of the present disclosure may function as a computer that processes the wireless communication methods of the present disclosure. FIG. 7 is a drawing illustrating an example of a hardware configuration of the base station 10 and the terminal 20 according to an embodiment of the present disclosure. The base station 10 and the terminal 20 above may be physically configured as a computer device including a processor 1001, a storage device 1002, an auxiliary storage device 1003, a communication device 1004, an input device 1005, an output device 1006, a bus 1007 and the like.

In the following description, term "device" can be understood as a circuit, a device, a unit and the like. A hardware configuration of the base station and the terminal 20 may be configured to include one or more of the devices shown in the drawings or may be configured to not include some of the devices.

Each function in the base station 10 and the terminal 20 is achieved by the processor 1001 to perform calculation by loading a predetermined software (a program) on hardware such as the processor 1001 and the storage device 1002, by controlling communication by the communication device 1004, and by controlling at least one of reading and writing data on the storage device 1002 and the auxiliary storage device 1003.

The processor 1001, for example, operates an operating system to control the entire computer. The processor 1001 may be configured by a central processing unit (CPU) including an interface with a peripheral equipment, a control device, an arithmetic device, a register and the like. For example, the controlling unit 140, the controlling unit 240 and the like above may be achieved by the processor 1001.

Further, the processor 1001 reads a program (a program code), a software module, data and the like from at least one of the auxiliary storage device 1003 and the communication device 1004 into the storage device 1002, and performs various processes according to the program, the software module and the data. For the program, a program that causes a computer to perform at least some of the operations described in the above embodiments is used. For example, the controlling unit 140 of the base station 10 shown in FIG. 5 may be included in the storage device 1002 and achieved by a control program operated on the processor 1001. Further, for example, the controlling unit 240 of the terminal 20 shown in FIG. 6 may be included in the storage device 1002 and achieved by a control program operated on the processor 1001. Although it has been described that the various processes described above are performed by one processor 1001, these processes may be performed simultaneously or sequentially by two or more processors 1001. The processor 1001 may be implemented by one or more chips. The program may be transmitted from a network via a telecommunication line.

The storage device 1002 is a computer-readable recording medium, and may be configured by at least one of, for example, ROM (Read Only Memory), EPROM (Erasable Programmable ROM), EEPROM (Electrically Erasable Programmable ROM), and RAM (Random Access Memory). The storage device 1002 may be called a register, a cache, a main memory (a main storage device) and the like. The storage device 1002 can store a program (a program code), a software module and the like that can be operate to implement a communication method according to one embodiment of the present disclosure.

The auxiliary storage device 1003 is a computer-readable recording medium, and may be configured by at least one of, for example, an optical disk such as a CD-ROM (Compact Disc ROM), a hard disk drive, a flexible disk, an optical magnetic disk (for example, a compact disk, a digital versatile disk, Blu-ray (registered trademark) disk), a smart card, a flash memory (for example, a card, a stick, a key drive), a floppy (registered trademark) disk, and a magnetic strip. The storage medium described above may be, for example, a database, a server or other suitable mediums including at least one of the storage device 1002 and the auxiliary storage device 1003.

The communication device 1004 is hardware (a transmitting/receiving device) for communicating between computers via at least one of a wired network and a wireless network, and is also referred to as, for example, a network device, a network controller, a network card, and a communication module. The communication device 1004 may be configured to include, for example, a high frequency switch, a duplexer, a filter, and a frequency synthesizer in order to achieve at least one of frequency division duplex (FDD) and time division duplex (TDD). For example, a transmitting/receiving antenna, an amplifier unit, a transmitting/receiving unit, a transmission line interface and the like may be achieved by the communication device 1004. The transmission/receiving unit may be implemented in a physically or logically separated manner between the transmitting unit and the receiving unit.

The input device 1005 is an input device (for example, a keyboard, a mouse, a microphone, a switch, a button, and a sensor) that receives input from outside. The output device 1006 is an output device (for example, a display, a speaker, and an LED lamp) that performs output to outside. The input device 1005 and the output device 1006 may have an integrated configuration (for example, a touch panel).

Further, each device such as the processor 1001 and the storage device 1002 is connected by a bus 1007 for communicating information. The bus 1007 may be configured by using a single bus, or may be configured by using a different bus for each device.

Further, the base station 10 and the terminal 20 may be configured to include hardware such as a microprocessor, a digital signal processor (DSP), an application specific integrated circuit (ASIC), a programmable logic device (PLD), a field programmable gate array (FPGA) and the like, and some or all of the functional blocks may be achieved by the hardware. For example, the processor 1001 may be implemented using at least one of these hardware devices.

Summary of Embodiments

As described above, according to the embodiments of the present invention, provided is a terminal having a controlling unit configured to determine a number of resource blocks to be allocated to a physical uplink control channel satisfying a bandwidth and map the physical uplink control channel to a physical resource, and a transmitting unit configured to transmit the physical resource to a base station.

With the above configuration, the base station 10 and the terminal 20 can configure the bandwidth of PUCCH that satisfies regulations related to a peak EIRP by controlling a number of resource blocks or SCSs. That is, resource allocation adapted to a frequency band in a wireless communication system can be performed.

The controlling unit may determine the subcarrier spacing, based on a maximum allowable EIRP (equivalent isotropically radiated power) in the bandwidth. With the configuration, the terminal 20 can configure the bandwidth of PUCCH that satisfies regulations related to a peak EIRP by controlling SCS.

The controlling unit may determine the subcarrier spacing, based on a parameter related to spatial multiplexing applied to the physical uplink control channel. With the configuration, the terminal can configure the bandwidth of PUCCH that satisfies regulations related to a peak EIRP by controlling a subcarrier spacing, based on an MIMO parameter.

The controlling unit may repeatedly map the physical uplink control channel to the physical resource for each resource block. With the configuration, the terminal 20 can configure the bandwidth of PUCCH that satisfies regulations related to a peak EIRP by controlling a number of resource blocks, and improve the reliability of PUCCH transmission.

Further, according to the embodiments of the present invention, provided is a base station having a controlling unit configured to determine a subcarrier spacing to be applied to a physical uplink control channel satisfying a bandwidth, a transmitting unit configured to transmit information indicating the number of resource blocks to a terminal, and a receiving unit configured to receive a physical resource in which the physical uplink control channel is mapped, from the terminal.

With the above configuration, the base station 10 and the terminal 20 can configure the bandwidth of PUCCH that satisfies regulations related to a peak EIRP by controlling a number of resource blocks or SCSs. That is, resource allocation adapted to a frequency band in a wireless communication system can be performed.

Further, according to the embodiments of the present invention, provided is a communication method performed by a terminal including: determining a subcarrier spacing to be applied to a physical uplink control channel satisfying a certain bandwidth; mapping the physical uplink control channel to a physical resource; and transmitting the physical resource to a base station.

With the above configuration, the base station 10 and the terminal 20 can configure the bandwidth of PUCCH that satisfies regulations related to a peak EIRP by controlling a number of resource blocks or SCSs. That is, resource allocation adapted to a frequency band in a wireless communication system can be performed.

Supplement to Embodiments

Although the embodiments of the present invention have been described above, the disclosed inventions are not limited to such embodiments, and those skilled in the art will understand various modifications, corrections, alternatives, substitutions and the like. Although explanations have been given using specific numerical examples in order to promote understanding of the present invention, these numerical values are merely examples and any appropriate values may be used unless otherwise specified. Classification of items in the above description is not essential to the present invention, and elements described in two or more items may be used in combination as necessary, and an element described in one item may be applied to another element (as long as there is no contradiction) described in other items. A boundary of the functional unit or the processing unit in the functional block diagram does not necessarily correspond to a boundary of the physical components. Operations of the plurality of functional units may be physically performed by one component, or operations of one functional unit may be physically performed by a plurality of components. For the processing procedure described in the embodiments, the processing order may be changed as long as there is no contradiction. For convenience of description of processing, although the base station 10 and the terminal 20 have been described with reference to functional block diagrams, such devices may be implemented in hardware, software, or a combination thereof. Software operated by a processor of the base station 10 according to the embodiment of the present invention and software operated by a processor of the terminal 20 according to the embodiment of the present invention respectively may be stored in a random access memory (RAM), a flash memory, a read-only memory (ROM), EPROM, EEPROM, a register, a hard disk (HDD), a removable disk, CD-ROM, a database, a server or any other suitable storage medium.

Further, the notification of information is not limited to the aspects/embodiments described in the present disclosure, and may be performed by using other methods. For example, the notification of information may be performed by physical layer signaling (for example, DCI (Downlink Control Information), UCI (Uplink Control Information)), higher layer signaling (for example, RRC (Radio Resource Control) signaling, MAC (Medium Access Control) signaling, notification information (MIB (Master Information Block)), SIB (System Information Block)), other signals or a combination thereof. Further, RRC signaling may be called an RRC message and may be, for example, an RRC connection setup message, and an RRC connection reconfiguration message.

Each aspect/embodiment described in the present disclosure may be applied at least one of LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), a system using other suitable systems, and a next generation system expanded based on these. Further, a plurality of systems may be applied in a combination (for example, a combination of at least one of LTE and LTE-A and 5G).

The order of processing procedures, sequences, flowcharts, etc. of each aspect/embodiment described in the present specification may be changed as long as there is no contradiction. For example, the methods described in the present disclosure present elements of various steps using exemplary orders, and are not limited to the particular order presented.

The specific operation performed by the base station 10 in the present specification may be performed by its upper node in some cases. In a network consisting of one or more network nodes having the base station 10, it is obvious that various operations performed for communication with the terminal 20 are performed by the base station 10 and at least one of other network nodes (for example, MME, and S-GW, but not limited to these) other than the base station 10. In the above example, a case where there is one network node other than the base station is illustrated, but other network nodes may be a combination of a plurality of the other network nodes (for example, MME and S-GW).

The information, signals, etc. described in the present disclosure may be output from an upper layer (or a lower layer) to a lower layer (or an upper layer). Input/output may be performed via a plurality of network nodes.

The input/output information and the like may be stored in a specific place (for example, a memory) or may be managed using a management table. Information to be input/output may be overwritten, updated or added. The output information and the like may be deleted. The input information and the like may be transmitted to the other device.

Determination in the present disclosure may be performed by a value represented by 1 bit (0 or 1), may be performed by a true/false value (Boolean: true or false), or may be performed by comparison of numerical values (for example, comparison with a predetermined value).

Software, whether called software, firmware, middleware, microcode, hardware description language, or other names, should be broadly interpreted to mean an instruction, an instruction set, a code, a code segment, a program code, a program, a subprogram, a software module, an application, a software application, a software package, a routine, a subroutine, an object, an executable file, an execution thread, a procedure, a feature and the like.

Further, software, an instruction, information and the like may be transmitted and received via a transmission medium. For example, if software uses at least one of wired technology (coaxial cable, optical fiber cable, twisted pair, digital subscriber line (DSL), etc.) and wireless technology (infrared, microwave, etc.) and is transmitted from a website, a server or other remote sources, at least one of these wired and wireless technologies is included within the definition of a transmission medium.

The information, signal, etc. described in the present disclosure may be represented using any of a variety of different technologies. For example, the data, the instruction, the commands, the information, the signal, the bit, the symbol, the chip, etc. may be represented by voltage, current, electromagnetic waves, magnetic field or magnetic particle, light field or photon, or any combination of these.

The terms described in the present disclosure and the terms necessary for understanding the present disclosure may be replaced with terms having the same or similar meanings. For example, at least one of the channel and the symbol may be a signal (signaling). The signal may also be a message. Further, the component carrier (CC) may be called a carrier frequency, a cell, a frequency carrier and the like.

The terms "system" and "network" used in the present disclosure are used interchangeably.

Further, the information, parameters, etc. described in the present disclosure may be represented using an absolute value, may be represented by a relative value from a predetermined value, or may be represented by other corresponding information. For example, a radio resource may be indicated by an index.

The names used for the parameters mentioned above should not be limited in any respect. Further, mathematical formulas and the like using these parameters may differ from those explicitly disclosed in the present disclosure. Since various channels (for example, PUCCH, and PDCCH) and information elements can be identified by any suitable names, various names assigned to these various channels and information elements should net be limited in any respect.

In the present disclosure, the terms "base station (BS)", "wireless base station", "base station device", "fixed station", "NodeB", "eNodeB (eNB)", "gNodeB (gNB)", "access point", "transmission point", "reception point", "transmission/reception point", "cell", "sector", "cell group", "carrier", "component carrier", etc. may be used interchangeably. The base station may be called by terms such as macrocell, small cell, femtocell and picocell.

The base station can accommodate one or more (for example, three) cells. When the base station accommodates a plurality of cells, the entire base station coverage area can be divided into a plurality of smaller areas, and each of the smaller areas can provide communication service by a base station subsystem (for example, a small indoor base station (RRH: Remote Radio Head)). The term "cell" or "sector" refers to a part or the whole of at least one of the coverage area of the base station and the base station subsystem that provides communication service in this coverage.

In the present disclosure, the terms "mobile station (MS)", "user terminal", "user equipment (UE)", "terminal", etc. may be used interchangeably.

The mobile station may be called by those skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

At least one of the base station and the mobile station may be called a transmission device, a reception device, a communication device and the like. At least one of the base station and the mobile station may be a device mounted on a movable body, a movable body itself and the like. The movable body may be a vehicle (for example, a car, and an airplane), may be an unmanned movable body (for example, a drone, and a self-driving car), or may be a robot (manned or unmanned). It should be noted that at least one of the base station and the mobile station includes a device that does not necessarily move during communication operation. For example, at least one of the base station and the mobile station may be IoT (Internet of Things) equipment such as a sensor.

Further, the base station in the present disclosure may be replaced by a user terminal. For example, each aspect/embodiment of the present disclosure may be applied to a configuration replaced by communication between a plurality of terminals 20 (for example, called D2D (Device-to-Device), and V2X (Vehicle-to-Everything)) for communication between the base station and the user terminal. In this case, the terminal 20 may have the function of the base station 10 described above. In addition, terms such as "upstream" and "downstream" may be replaced by terms corresponding to communication between terminals (for example, "side"). For example, an upstream channel, a downstream channel and the like may be replaced by a side channel.

Similarly, the user terminal in the present disclosure may be replaced by a base station. In this case, the base station may have the function of the user terminal described above.

A term "determining" used in the present disclosure may include a wide variety of operations. "Determining" may include "determining" judging, calculating, computing, processing, deriving, investigating, looking up, search, inquiry (for example, searching in a table, a database or another data structure) and ascertaining. "Determining" may include "determining" receiving (for example, receiving information), transmitting (for example, transmitting information), input, output and accessing (for example, accessing data in a memory). Further, "determining" may include "determining" resolving, selecting, choosing, establishing, comparing, etc. That is, "determining" may include "determining" a certain operation. Further, "determining" may be replaced by "assuming", "expecting", "considering" and the like.

Terms "connected" and "coupled" or any variation thereof refer to any direct or indirect connection or coupling between two or more elements and may include the presence of one or more intermediate elements between the two "connected" or "coupled" elements each other. Connection or coupling between the elements may be physical, logical, or a combination thereof. For example, "connection" may be replaced by "access". As used in the present disclosure, the two elements use at least one of one or more wires, cables and printed electrical connections, and as some non-limiting and non-comprehensive examples, and are considered to be "connected" or "coupled" to each other using electromagnetic energy having wavelengths in a radio frequency domain, a microwave domain and a light (both visible and invisible) domain.

The reference signal may be abbreviated as RS and may be called a pilot according to the applied standard.

"Based on" as used in the present disclosure does not mean "based only on" unless otherwise stated. In other words, the phrase "based on" means both "based only on" and "based at least on".

Any reference to the elements using designations such as "first", "second" and so on as used in the present disclosure does not generally limit the quantity or order of those elements. These designations may be used in the present disclosure as a convenient method to distinguish between two or more elements. Therefore, references to the first and second elements do not mean that only two elements can be adopted, or that the first element must somehow precede the second element.

The "means" in the configuration of each of the above devices may be replaced by a "part", a "circuit", a "device" and the like.

When "include", "including" and variations thereof are used in the present disclosure, these terms are intended to be inclusive as a term "comprising". Further, the term "or" used in the present disclosure is intended not to be exclusive.

A radio frame may be configured by one or more frames in a time domain. Each frame of the one or more frames in the time domain may be called a subframe. The subframe may further be configured by one or more slots in the time domain. The subframe may be a fixed time length (for example, 1 ms) that does not depend on numerology.

The numerology may be a communication parameter that applies to at least one of transmission and reception of a signal or a channel. The numerology may indicate at least one of, for example, a subcarrier spacing (SCS), a bandwidth, a symbol length, a cyclic prefix length, a transmission time interval (TTI), a number of symbols per TTI, a wireless frame configuration, a specific windowing process performed by a transmitter/receiver to perform in a frequency domain, and a specific window wink process for the transmitter/receiver to perform in a time domain.

The slot may be configured by one or more symbols (OFDM (Orthogonal Frequency Division Multiplexing) symbol, and SC-FDMA (Single Carrier Frequency Division Multiple Access) symbol, etc.) in the time domain. The slot may be in time units based on numerology.

The slot may include a plurality of mini slots. Each mini slot may be configured by one or more symbols in the time domain. Further, the mini slot may be called a sub slot. The mini slot may be configured by a smaller number of symbols than the slots. PDSCH (or PUSCH) transmitted in the time unit larger than the mini slot may be called PDSCH (or PUSCH) mapping type A. PDSCH (or PUSCH) transmitted using the mini slot may be called PDSCH (or PUSCH) mapping type B.

The radio frame, the subframe, the slot, the mini slot and the symbol all represent in the time unit for transmitting a signal. For the radio frame, the subframe, the slot, the mini slot and the symbol, correspondingly different names may be used.

For example, one subframe may be called a transmission time interval (TTI), a plurality of consecutive subframes may be called TTI, and one slot or one mini slot may be called TTI. That is, at least one of the subframe and TTI may be a subframe (1 ms) in existing LTE, may be a period shorter than 1 ms (for example, 1-13 symbols), or may be a period longer than 1 ms. The unit representing TTI may be called a slot, a mini slot and the like instead of the subframe.

Here, TTI refers to, for example, the minimum time unit of scheduling in wireless communication. For example, in the LTE system, the base station schedules each terminal 20 to allocate a wireless resource (a frequency bandwidth that can be used in each terminal 20, transmission power, etc.) in a TTI unit. The definition of TTI is not limited to this.

TTI may be a transmission time unit such as a channel-encoded data packet (transport block), a code block, a code word and the like, and may be a processing unit such as scheduling, link adaptation and the like. When TTI is given, the time interval (for example, a number of symbols) to which the transport block, the code block, the code word, etc. is actually mapped may be shorter than the corresponding TTI.

When one slot or one mini slot is called TTI, one or more TTI (that is, one or more slots or one or more mini slots) may be the minimum time unit for scheduling. Further, a number of slots (a number of mini slots) configuring the minimum time unit of the corresponding scheduling may be controlled.

TTI having a time length of 1 ms may be called a usual TTI (TTI in LTE, Rel. 8-12), a normal TTI, a long TTI, a usual subframe, a normal subframe, a long subframe, a slot and the like. A TTI shorter than the normal TTI may be called a shortened TTI, a short TTI, a partial TTI (a partial or fractional TTI), a shortened subframe, a short subframe, a mini slot, a subslot, a slot and the like.

The long TTI (for example, a usual TTI and a subframe) may be replaced by a TTI having a time length of more than 1 ms, and the short TTI (for example, a shortened TTI) may be replaced by a TTI having a TTI length less than the TTI length of the long TTI and of 1 ms or more.

The resource block (RB) is a resource allocation unit in the time domain and the frequency domain and may include one or more continuous subcarriers in the frequency domain. A number of subcarriers included in RB may be the same regardless of numerology, for example, it may be 12. A number of subcarriers included in RB may be determined based on numerology.

The time domain of RB may also include one or more symbols and may be a length of one slot, one mini slot, one subframe, or one TTI. Each of one TTI, one subframe, etc. may be configured by one or more resource blocks.

One or more RBs may be called a physical resource block (PRB: Physical RB), a sub-carrier group (SCG), a resource element group (REG), a PRB pair, an RB pair and the like.

Further, the resource block may be configured by one or more resource elements (REs). For example, one RE may be a wireless resource domain of one subcarrier and one symbol.

A bandwidth part (BWP) (which may also be called a partial bandwidth) may represent a subset of consecutive common RB (common resource blocks) for a certain neurology in a certain carrier. Here, the common RB may be specified by an index of RB with respect to a common reference point of the carrier. PRB may be defined in a certain BWP and may be numbered within the corresponding BWP.

The BWPs may include a BWP for UL (UL BWP) and a BWP for DL (DL BWP). One or more BWPs may be set in one carrier for UE.

At least one of the set BWP may be active and UE may not be assumed to transmit/receive a predetermined signal/channel outside the active BWP. Further, the "cell", "carrier", etc. in the present disclosure may be replaced by "BWP".

The configurations of the radio frame, the subframe, the slot, the mini slot, the symbol and the like described above are merely examples. For example, configurations such as a number of subframes included in the radio frame, a number of slots per subframe or radio frame, a number of mini slots included in the slot, a number of symbols and RBs included in the slot or the mini slot, a number of subcarriers included in RB, a number of symbols in TTI, the symbol length, the cyclic prefix (CP) length can be changed in various ways.

In the present disclosure, if an article is added by translation, for example, a, an and the in English, the present disclosure may include plural nouns following these articles.

In the present disclosure, a term "A and B are different" may mean "A and B are different from each other". The term may also mean "A and B are different from C". Terms such as "separate", "combine" and the like may be interpreted in the same way as "be different".

Each aspect/embodiment described in the present disclosure may be used alone, may be used in combination, or may be used by switching according to performance. Further, a notification of predetermined information (for example, a notification of "being X") is not limited to an explicit one, and may be performed implicitly (for example, the notification of the predetermined information is not performed).

PUCCH according to the present disclosure is an example of physical uplink control channel. TCI state ID or PUCCH-SpatialRelationInfo are examples of parameters related to spatial multiplexing.

Although the present disclosure has been described in detail above, it is clear to those skilled in the art that the present disclosure is not limited to the embodiments described in the present disclosure. The present disclosure may be implemented as amendment and modification aspects without departing from the spirit and scope of the present disclosure, which are determined by the description of the scope of claims. Therefore, description of the present disclosure is for purposes of illustration and does not have any limiting meaning to the present disclosure.

EXPLANATION OF REFERENCE NUMERALS

10 Base station
110 Transmitting unit
120 Receiving unit
130 Configuring unit
140 Controlling unit
20 Terminal
210 Transmitting unit
220 Receiving unit
230 Configuring unit
240 Controlling unit
1001 Processor
1002 Storage device
1003 Auxiliary storage device
1004 Communication device
1005 Input device
1006 Output device

The invention claimed is:

1. A terminal comprising:
a receiving unit configured to receive information indicating a number of resource blocks to be allocated to a format of a physical uplink control channel from a base station;

a controlling unit configured to map the physical uplink control channel to a physical resource of the number of resource blocks; and
a transmitting unit configured to transmit the physical uplink control channel to the base station using the physical resource, wherein
the transmitting unit transmits information to the base station indicating whether or not an allocation of a plurality of resource blocks to the physical uplink control channel is supported in each of a plurality of subcarrier spacings that includes possible values of 120 kHz, 480 kHz, and 960 kHz for the plurality of subcarrier spacings.

2. A communication system comprising: a terminal; and a base station, wherein
the terminal includes:
a receiving unit configured to receive information indicating a number of resource blocks to be allocated to a format of a physical uplink control channel from the base station;
a controlling unit configured to map the physical uplink control channel to a physical resource of the number of resource blocks; and
a transmitting unit configured to transmit the physical uplink control channel to the base station using the physical resource, wherein
the transmitting unit transmits information to the base station indicating whether or not an allocation of a plurality of resource blocks to the physical uplink control channel is supported in each of a plurality of subcarrier spacings that includes possible values of 120 kHz, 480 kHz, and 960 kHz for the plurality of subcarrier spacings, and
the base station includes:
a transmitting unit configured to transmit the information indicating the number of resource blocks to be allocated to the physical uplink control channel to the terminal;
a controlling unit configured to assume that the physical uplink control channel is to be mapped to a physical resource of the number of resource blocks; and
a receiving unit configured to receive the physical uplink control channel from the terminal using the physical resource, wherein
the receiving unit receives information indicating whether or not an allocation of a plurality of resource blocks to the physical uplink control channel is supported in each of a plurality of subcarrier spacings from the terminal.

3. A communication method performed by a terminal, the communication method comprising:
receiving information indicating a number of resource blocks to be allocated to a format of a physical uplink control channel from a base station;
mapping the physical uplink control channel to a physical resource of the number of resource blocks;
transmitting the physical uplink control channel to the base station using the physical resource; and
transmitting information to the base station indicating whether or not an allocation of a plurality of resource blocks to the physical uplink control channel is supported in each of a plurality of subcarrier spacings that includes possible values of 120 kHz, 480 kHz, and 960 kHz for the plurality of subcarrier spacings.

* * * * *